(12) United States Patent
Arnason et al.

(10) Patent No.: US 7,057,118 B2
(45) Date of Patent: Jun. 6, 2006

(54) METHOD AND AN APPARATUS FOR WEIGHING PORTIONS

(75) Inventors: Ingolfur Arnason, Akranes (IS); Kristjan Thor Gudmundsson, Akranes (IS); Hordur Gardarsson, Akranes (IS); Johannes Simonssen, Akranes (IS); Einar Brandsson, Akranes (IS); Asgeir Marino Rudolfsson, Reykjavik (IS); Sigurdur Magnus Skulason, Akranes (IS)

(73) Assignee: Skaginn hf, Akranes (IS)

( * ) Notice: Subject to any disclaimer, the term of this patent is extended or adjusted under 35 U.S.C. 154(b) by 77 days.

(21) Appl. No.: 10/475,725

(22) PCT Filed: Apr. 24, 2002

(86) PCT No.: PCT/IS02/00009

§ 371 (c)(1),
(2), (4) Date: Mar. 22, 2004

(87) PCT Pub. No.: WO02/086429

PCT Pub. Date: Oct. 31, 2002

(65) Prior Publication Data

US 2004/0144573 A1   Jul. 29, 2004

(30) Foreign Application Priority Data

Apr. 24, 2001   (IS)   .......................... 5927

(51) Int. Cl.
*G01G 19/387*   (2006.01)
*G01G 13/00*   (2006.01)

(52) U.S. Cl. .................. 177/25.18; 177/103; 177/121; 222/77

(58) Field of Classification Search ............ 177/25.18, 177/103–123; 222/55–56, 77
See application file for complete search history.

(56) References Cited

U.S. PATENT DOCUMENTS

| | | | | |
|---|---|---|---|---|
| 4,010,809 A | * | 3/1977 | Hobart | 177/1 |
| 4,446,937 A | * | 5/1984 | Asai | 177/1 |
| 4,494,619 A | * | 1/1985 | Matsuno | 177/25.18 |
| 4,499,961 A | * | 2/1985 | Fukuda | 177/25.18 |
| 4,534,430 A | * | 8/1985 | Steel | 177/25.18 |
| 4,569,446 A | * | 2/1986 | Kelley | 209/660 |
| 4,678,047 A | * | 7/1987 | Kataoka et al. | 177/1 |
| 4,840,240 A | * | 6/1989 | Toyoda et al. | 177/25.18 |
| 4,874,048 A | * | 10/1989 | Kawanishi et al. | 177/25.18 |
| 4,901,807 A | * | 2/1990 | Muskat et al. | 177/25.18 |
| 4,967,856 A | * | 11/1990 | Kawanishi et al. | 177/25.18 |
| 5,894,111 A | * | 4/1999 | Kawanishi | 177/25.18 |
| 5,910,646 A | * | 6/1999 | Kawanishi | 177/25.18 |
| 5,981,882 A | * | 11/1999 | Kawanishi | 177/25.18 |
| 6,235,998 B1 | * | 5/2001 | Brewer | 177/103 |

* cited by examiner

*Primary Examiner*—Randy W. Gibson
(74) *Attorney, Agent, or Firm*—Finnegan, Henderson, Farabow, Garrett & Dunner LLP (57) ABSTRACT

The present invention provides an automatic method and apparatus for weighing into portions. Feeding of single units is performed by separating the feeding channels for rough feeding and fine feeding so that the feeding up to the weighing station is separated. When weighed portions are too large compared to a predetermined value, the apparatus rejects the portions and returns them back to the feeding stream. By separating the stream of units into fine weighing and rough weighing, with a rejection of unsatisfied portions, the portions can accurately be weighed with high performance with apparatus that is both inexpensive and space saving.

21 Claims, 7 Drawing Sheets

METHOD AND AN APPARATUS FOR WEIGHING PORTIONS

FIELD OF THE INVENTION

The invention relates to a method and apparatus for weighing portions by means of separating in-feed channels for rough weighing and fine weighing and by means of rejecting the portions with too large overweight and returning them back to the in-feed stream.

BACKGROUND

Methods and apparatus for weighing portions are known. Weighing systems based on batching on peaces/units are known and can with a considerable accuracy be weighed so that portions will neither be too large nor to too small within a predetermined limit.

In GB A 1 575 683 a batch weighing apparatus is described for automatic weighing successive batches of material and products from bulk in an automatic operating cycle, said apparatus including a rough feed means operable to feed a major part of each batch into a weigh-pan of the apparatus in a fast rate and fine feed means operable to feed remaining part of the batch.

DE A1 1575683 describes an apparatus for making portions of tobacco in a similar way, i.e. in a first step a rough weight limit is obtained and subsequently the portion is completed with a fine weighing.

Several other weighing methods and devices have been described such as in U.S. Pat. No. 4,901,807, where a device for providing a quantity of product with predetermined weight to a collecting means is disclosed. The U.S. Pat. No. 4,010,809 discloses a method for weighing product pieces of irregular size and weight into batches, where smaller pieces are guided into a separate lane for reaching a predetermined weight. An apparatus for weighing and delivering products like potatoes is disclosed in the U.S. Pat. No. 3,720,276, where the products are conveyed separately in two weight ranges to a receptacle in order to obtain a number of products for packing within a predetermined weight range. A UK patent document discloses an apparatus for quantifying tobacco into doses using a coarse-dosing device and a fine dosing device to obtain a desired weight of tobacco in a dose in a weighing compartment. Finally, the U.S. Pat. No. 4,313,507 claims a method for grouping a population of articles into a portion having a weight at least equal to a desired target weight.

The problem with these methods and devices is that it they are not suited for making more than one portions simultaneously. Further, a portion with too large overweight cannot be rejected without performing a new rough and fine feeding.

There is therefore a need for an apparatus for weighing a plurality of portions simultaneously, whereby portions with to large overweight may be rejected and returned back to the main stream without rejecting the whole portion.

DESCRIPTION OF THE INVENTION

It is an object of the present invention to provide a method and apparatus for weighing portions with a high accuracy in a fast and a simple way and to minimize the space and therefore to increase the potential of the apparatus where the space is limited.

According to the first aspect, the present invention relates to a method for forming units into portions with a predefined weight, said method comprising:

transferring the units in at least a first and a second feeding channels towards at least two weighing vessels,
dividing each weighing vessel into at least a first and a second weighing bins,
transferring the units in said first feeding channel into the first weighing bin of one weighing vessel up to a first weight limit of the weighing vessel,
transferring the units in the second feeding channel into the second weighing bin of the weighing vessel up to a second weight limit, such that the sum of said first and second weight limits define a target weight limit, wherein as the final target weight limit of the weighing vessel exceeds a predetermined upper weight limit, the first or the second weighing bin is rejected and emptied and the rejected units are circulated back into the feeding channels, whereas when the final target weight limit is within a certain proximity from a certain ideal final target weight limit; the total weighing vessel is accepted.

In one preferred embodiment, which we will assume in the subsequent description, the first weighing bin is a rough weighing bin and the second weighing bin is a fine weighing bin and the first weight limit is a rough weight limit and the second weight limit a fine weight limit. It follows that the first feeding channel is rough feeding channel and the second feeding channel a fine feeding channel.

Accordingly, as the rough weight limit is reached in the first weighing vessel, the rough feeding channel transfers the items subsequently into the rough weighing bin of the second weighing vessel. This is to maintain the filling process running while the fine filling in the fine weighing bin is proceeding. In one embodiment the conveyor speed is controllable, such as to stop the conveyor or slowing it down. When the final target weight limit is accepted the portion is emptied into a portioning chute that transfers the units into a suitable packaging. The number of weighing vessels may however be two or more. For simplification we assume the number of weighing bins is two.

The feeding of units into the weighing vessels may be done by transferring units with a rough feeding channel into the rough weighing bin of the first weighing vessel, while simultaneously units are transferred with the fine feeding channel into the fine weighing bin of the second weighing vessel. This is, in the most preferred embodiment, performed automatically in a controlled way and can for example be realised by providing a control computer with a predetermined rough weighing and fine weighing limits for controlling the feeding into the vessels and for emptying the bins. Such a controlling computer is then connected to the scales of the weighing vessels as well as the kinetic apparatus, which is competent for controlling the feeding and emptying of the bins.

The units that are weighed can be fish fillets, frozen or fresh, pieces of any kind, such as meat pieces, or other raw material where the raw material stream comprises single pieces, that can have a different shape, size or weight. Further, by separating feeding channels into fine weighing and rough weighing as described, and by rejecting unsatisfying portions, it is possible to weigh very accurately with high performance. A conveyor conveys the rejected units back to the raw and/or fine material vessel that feeds the feeding channels. The features that only the fine weighing bin is emptied and not the whole portion is essential for the present invention while the whole portion as such is not rejected. This enhances the speed for generating a new portion, where the fine feeding must only be repeated and not the rough feeding. Accordingly, the whole procedure is fully automatic besides from feeding the units to an in-feed area, from which the units are transferred with the feeding channels.

As an example, one can imagine a predetermined portion should weight 5.5 kg with an accuracy of 25 g (5.5±0.025) kg, and that the rough weighing limit is 5.0 kg. Then the main bin is filled until its weight would reach the desired rough weighing limit, i.e. is at least 5.0 kg, wherein subsequently the fine portioning of units into the fine weighing bin of that weighing vessel starts. If for example in the fine weighing procedure three units in the fine weighing bin give a total weight of 5.4 kg, but the fourth unit gives 5.6 kg, then the weight is over a predetermined total limit, and the units in the fine weighing bin are rejected, i.e. it is emptied, without emptying the main bin. Then another attempt can be made for filling the fine weighing bin in the same way, and repeating such weighing and rejection until the units, that are in the fine weighing bin give a total weight which are within an ideal weight limit for that portion, or 25 g from the 5.5 kg in this particular example.

Also the ideal weight and the proximity can be adjusted so that the ideal weight is minimum and the proximity allowing overweight (not underweight).

According to the second aspect the present invention relates to an apparatus for weighing units into portions with a predefined weight, said apparatus comprising:
  a supporting frame,
  a feeding container,
  a conveyor comprising at least two feeding channels for conveying the units from the feeding container,
  at least two weighing vessels, wherein each weighing vessel is divided into at least a first and a second weighing bins,
  at least one scale for weighing the units is said bins,
  a releasing mechanism for releasing the units in said weighing bins, said releasing mechanism further being adapted for release said first and second weighing bins independently, and
  a controlling computer for controlling the feeding into the weighing vessels and the releasing mechanism.

A portioning chute is preferably provided for receiving a weighed portion from the weighing vessels and transferring the portion into suitable packaging. The portioning chute transfers then the portion that fulfils the criteria for the final weight of the portion directly into a bag bloated with an airflow nozzle for enabling the filling of the bag. The weighing vessels where the final weight limit is outside a predefined criteria reject the fine weighing bin. Those units are transferred back to the feeding container with a second conveyor. The controlling computer is provided with input means for data with predetermined rough weighing limit and predetermined total weight limit, wherein the controlling computer is connected to said scaling means of the weighing vessels and said releasing mechanism for emptying the weighing vessels.

BRIEF DESCRIPTION OF THE DRAWINGS

In the following the present invention, and in particular preferred embodiments thereof, will be described in greater details in connection with the accompanying drawings in which.

DETAILED DESCRIPTION OF THE INVENTION

Figure 1:
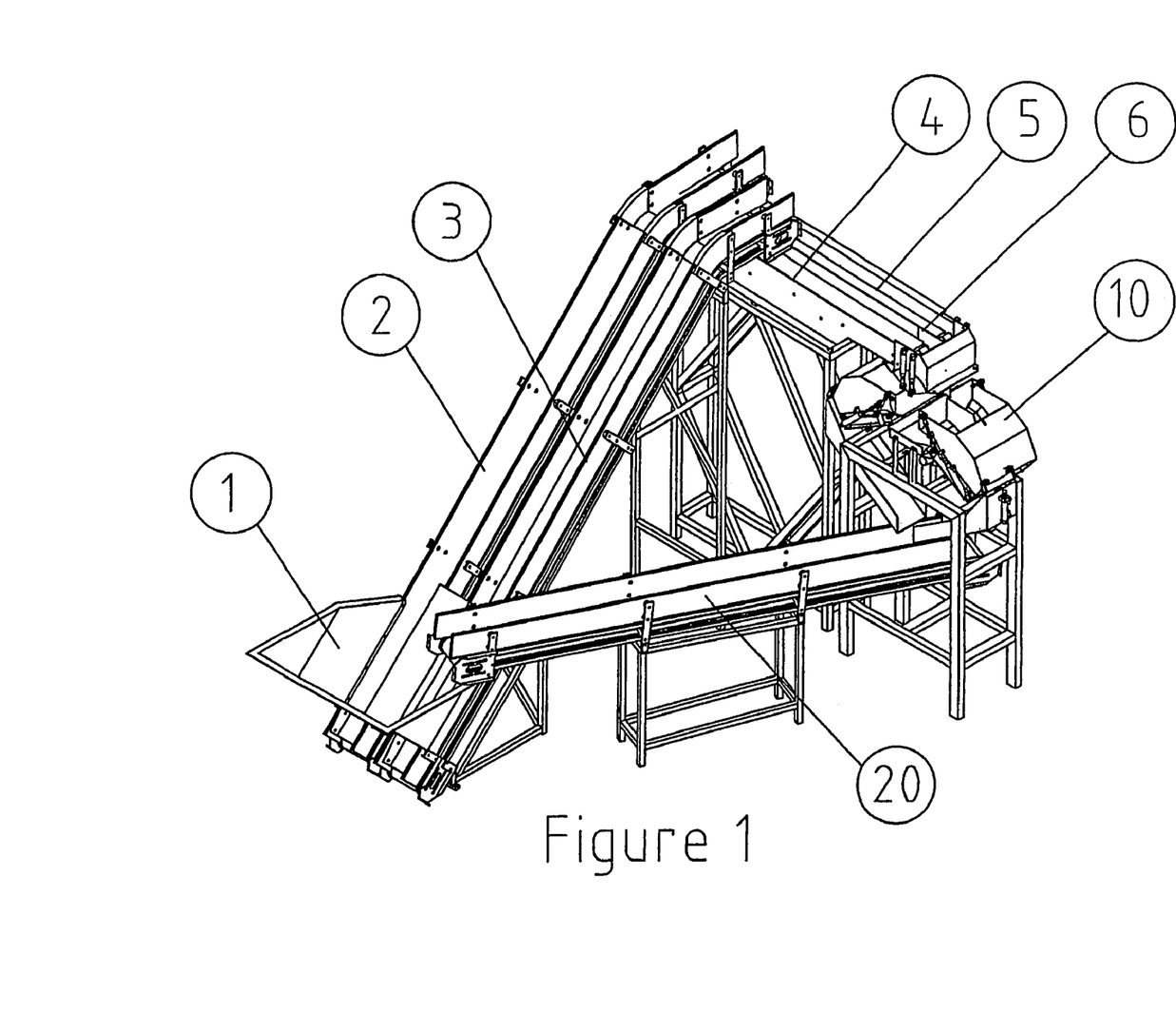
FIG. 1 shows a first overview of the apparatus.
Figure 2:
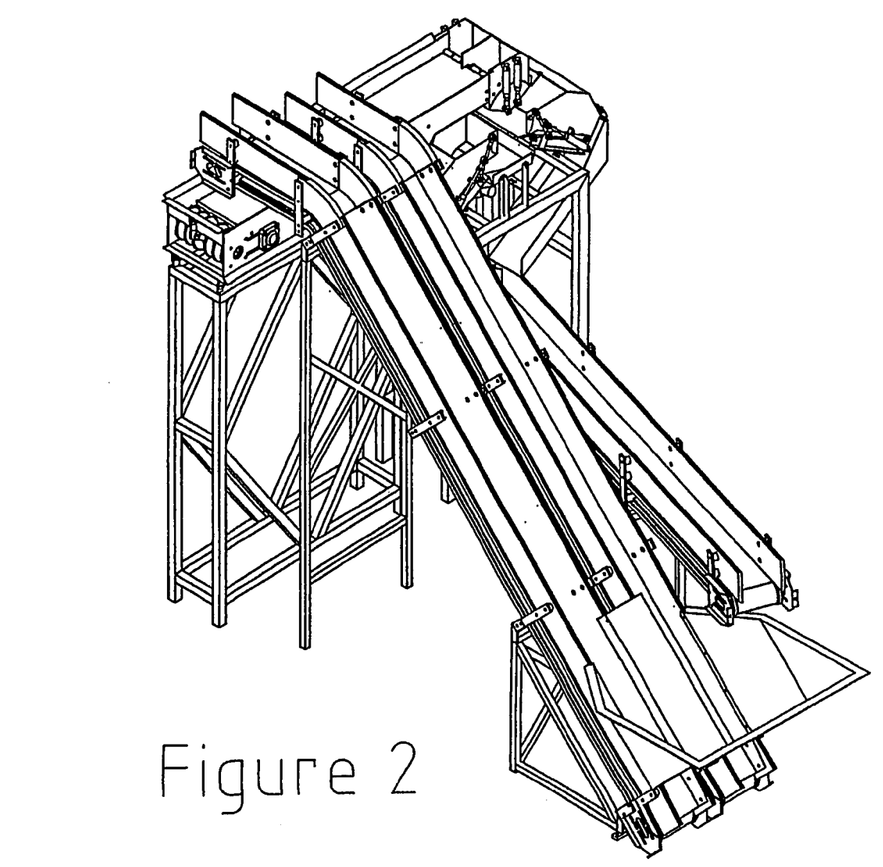
FIG. 2 shows a second overview of the apparatus.
Figure 3:
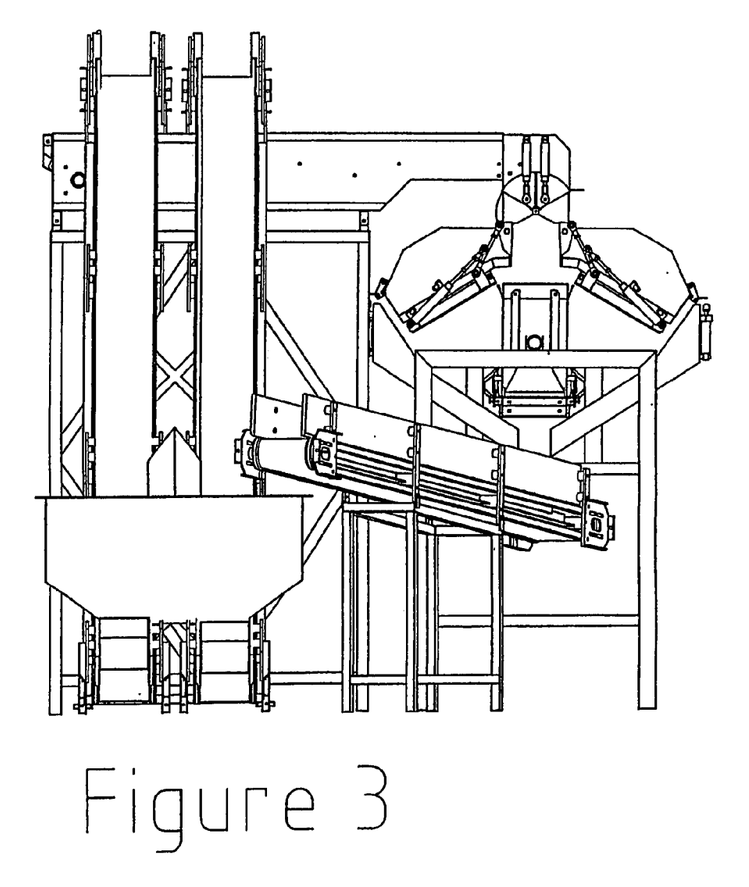
FIG. 3 shows a front view of the apparatus.
Figure 4:
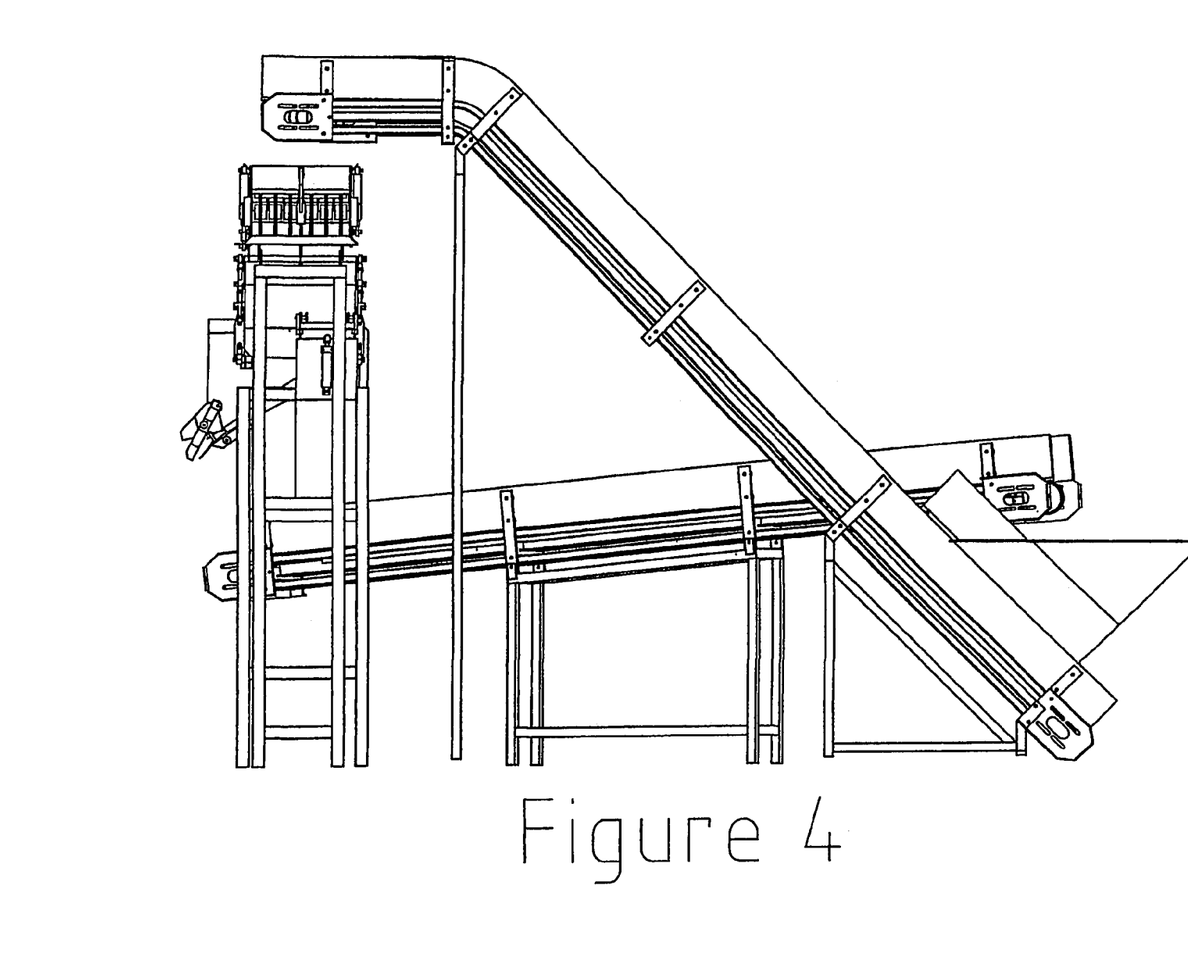
FIG. 4 shows a side view of the apparatus.
Figure 5:
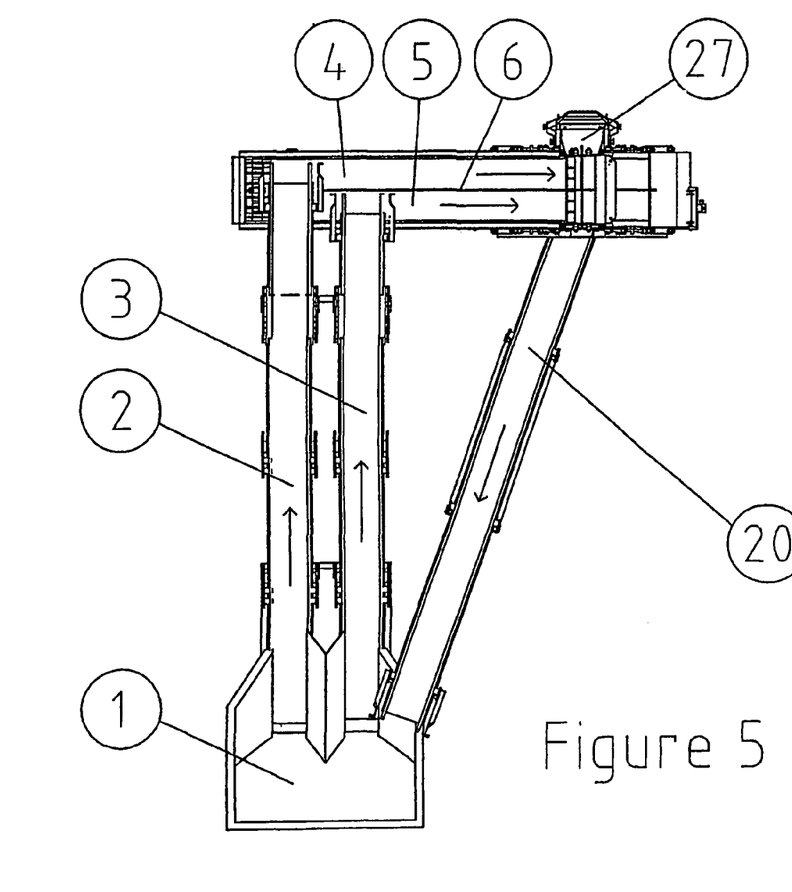
FIG. 5 shows a top view of the apparatus.
Figure 6:
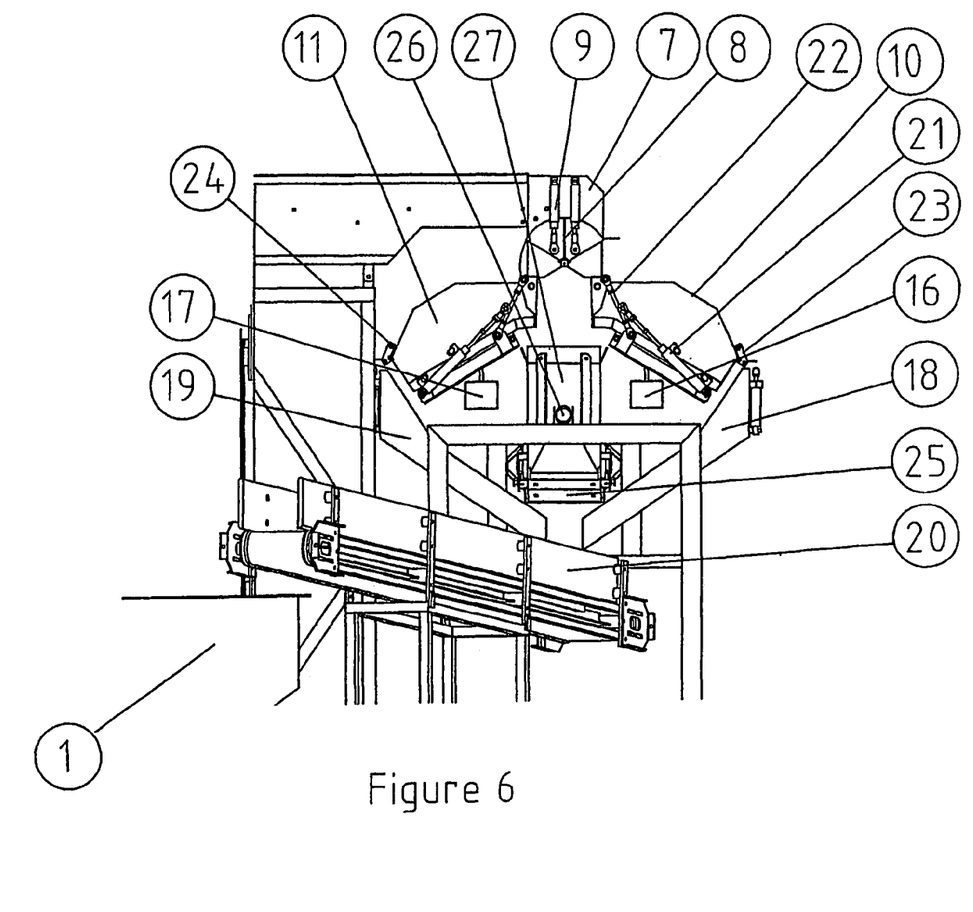
FIG. 6 shows another front view of the apparatus.
Figure 7:
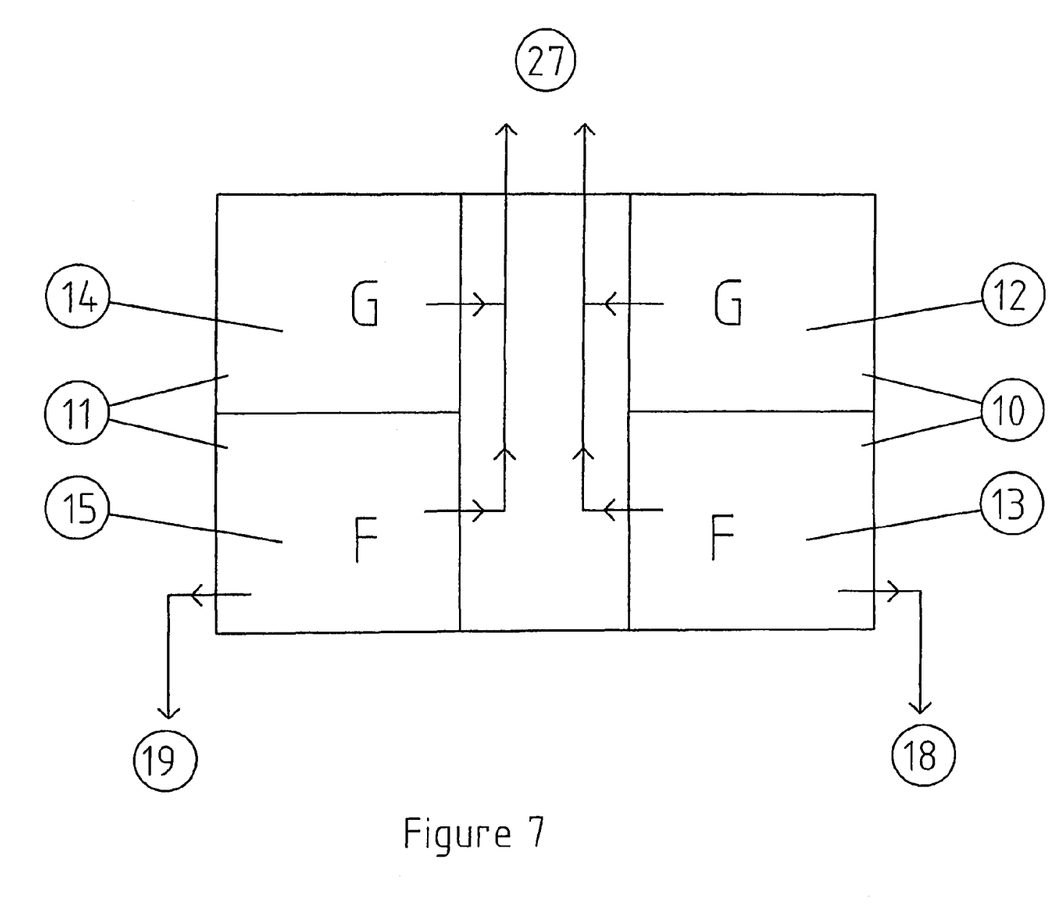
FIG. 7 shows two weighing vessels.

According to FIGS. 1–6, the apparatus comprises a supporting frame, a feeding container for raw material (1) from which the feeding conveyors (2) and (3) feed the apparatus with. Conveyor (2) feeds the part of the channel that provides the rough weighing with a raw material and conveyor (3) feeds the fine weighing part. Conveyors (2) and (3) provide raw material to conveyors (4) and (5), which are mounted in a common supporting frame, which is divided into two parts with a panel (6) so that a raw material for rough weighing and fine weighing does not mix. The stream of raw material for rough weighing and fine weighing is returned into a chute (7), which is bisectrf. The chute is provided with a dividing panel (8) and remote controlled air-jacks (9) to that the automation will be easier and faster. The dividing chute (7) returns raw material down to bisected weighing troughs (10) and (11) with bins (12) and (13) on one hand and (14) and (15) on the other, as shown in FIG. 7. Weighing troughs (10) and (11) are mounted on automatic scales (16) and (17).

When the rough feeding has reached a certain limit, for example 5.1 kg in for the weighing trough (10) in bin (12) as shown in FIG. 7, the dividing chute (7) divides the panel (8) so that the rough feeding stops and starts in weighing trough (11) in bin (14). While that rough weighing is proceeded, the fine weighing channel (5) feeds items into weighing trough (10) in bin (13) up to a certain limit that can for example be 5.5 kg. If the last single item in the fine weighing stream weighs more than can be regarded as acceptable overweight so that the total weight of the total weight in bins (12) and (13) exceeds for example 5.55 kg then the portion has too much overweight and will be rejected.

By rejecting only the amount that is in bin (13) it is avoided that the whole portion (12) must be weighed again and therefore a valuable time is saved. By repeating the fine weighing in bin (13) few times, if needed, the preferred value can be approached quick and safely in weighing trough (10) while the rough feeding in bin (14) is proceeded.

When fine weighing in weighing trough (10) is finished the fine weighing in bin (15) in weighing trough (11) can be started as well as the rough weighing in bin (12) in weighing trough (10).

When a portion is rejected in weighing trough (10) and (11) then air-jacks (21) and rod equipment (22) will attend an automatic emptying of the portion in the weighing bins (13) and (15) down the chutes (18) and (19) through the close (23) and (24) which return the portion which was rejected down to the conveyor (20) that returns the portion back to the feeding container (1).

When the portion in the weighing trough (10) and (11) as shown in FIG. 7 has reached a desirable weight the weighing trough is rolled with the jacks (21) and the rods (22) so that both the bins (12) and (13) on one hand and (14) and (15) on the other hand, so that the other weighed portion falls down into the funnel (chute)(27).

The funnel (27) is provided with automatic packaging means with plastic bags (25) for receiving said weighed portion wherein the bag is expanded by blowing air into it with a nozzle (26) that opens the bag and keeps it open so that the portion can safely slide into it. The bag with the weighed portion is then removed and replaced with a new one and the procedure repeated.

The system is controlled with an industrial computer and all the units of the system are controlled by controlling software. The weighing values are put into the software where registration and information from the processing system are collected.

Weighing system with more feeding channels can be made so that more than one feeding channels feed fine weighing and/or the rough weighing, and equip the weighing trough (10) and (11) so that the bins are more than two. Also the system can be provided with the option that the whole portion is rejected, both the rough feeding and the fine feeding, or if the fine weighing channels are more than one, that the fine weighing portions, two or more, are rejected either as a single portions or a part of the portions.

The invention claimed is:

1. A method for forming portions of materials having a predetermined weight, comprising:
   providing the materials, a weighing vessel, a first feeding channel, and a second feeding channel, the weighing vessel having a first weighing bin and a second weighing bin;
   transporting the materials toward the weighing vessel via the first feeding channel and the second feeding channel;
   feeding the materials from one of the first feeding channel and the second feeding channel into the first weighing bin;
   weighing the materials in the first weighing bin to obtain a first weight;
   feeding the materials from one of the first feeding channel and the second feeding channel into the second weighing bin; and
   weighing the materials in the second weighing bin to obtain a second weight less than the first weight,
   wherein the sum of the first weight and the second weight defines a total weight,
   wherein if the total weight is greater than a predetermined upper weight limit or less than a predetermined lower weight limit, the materials in the second weighing bin are emptied from the second weighing bin and are circulated back to at least one of the first feeding channel and the second feeding channel,
   whereas if the total weight is substantially equal to one of the predetermined upper weight limit and the predetermined lower weight limit or is between the predetermined upper weight limit and the predetermined lower weight limit, the materials in the weighing vessel are accepted,
   wherein the first weighing bin is a rough weighing bin and the second weighing bin is a fine weighing bin.

2. The method of claim 1, further comprising providing another weighing vessel having another first weighing bin and another second weighing bin.

3. The method of claim 2, wherein when the materials in the first weighing bin approaches a first weight limit, the first feeding channel transfers the materials into the another first weighing bin.

4. The method of claim 2, further comprising feeding the materials from one of the first feeding channel and the second feeding channel into the another first weighing bin.

5. The method of claim 4, wherein the feeding of the materials into the first weighing bin and the feeding of the materials into the another first weighing bin occurs substantially simultaneously.

6. The method of claim 1, further comprising emptying the materials in the weighing vessel into a portioning chute so as to transfers the materials into a suitable packaging.

7. The method of claim 1, wherein the materials in the weighing vessel are emptied after the materials in the weighing vessel are accepted.

8. The method of claim 1, wherein the weighing of the materials is performed automatically.

9. The method of claim 1, wherein the first weight is a rough weight.

10. The method of claim 1, wherein the second weight is a fine weight.

11. The method of claim 1, controlling the feeding of the materials into the first weighing bin and the second weighing bin.

12. The method of claim 11, wherein the controlling of the feeding includes determining whether the total weight is between predetermined parameters.

13. The method of claim 12, wherein the predetermined parameters includes the predetermined upper weight limit and the predetermined lower weight limit.

14. An apparatus for forming materials into portions having a predetermined weight, comprising:
    a supporting frame;
    a feeding container;
    a conveyor comprising at least two feeding channels configured to convey the materials from the feeding container;
    a weighing vessel having a first weighing bin and a second weighing bin;
    a scale for weighing the materials in at least one of the first weighing bin and the second weighing bin;
    a release mechanism configured to release the materials from the first weighing bin and the second weighing bins independently; and
    a computer configured to control both the feeding of the materials into the first weighing bin and the second weighing bin and the release of the materials from the first weighing bin and the second weighing bins,
    wherein the first weighing bin is a rough weighing bin and the second weighing bin is a fine weighing bin.

15. The apparatus of claim 14, further comprising another weighing vessel having another first weighing bin and another second weighing bin.

16. The apparatus of claim 14, further comprising a portioning chute configured to both receive the portions from the weighing vessel and transfer the portions into suitable packaging.

17. The apparatus of claim 16, wherein the portioning chute transfers the portions into a bag,
    wherein the bag is connected to an airflow nozzle configured to bloat the bag.

18. The apparatus of claim 14, further comprising another conveyor configured to convey materials from at least one of the first weighing bin and the second weighing bin to the feeding container.

19. The apparatus of claim 14, wherein the computer is configured to receive data including the predetermined weight, a predetermined upper weight limit, and a predetermined lower weight limit.

20. The apparatus of claim 14, wherein the computer is connected to the scale and the release mechanism.

21. The apparatus of claim 14, wherein the computer includes input means configured to receive data including the predetermined weight, a predetermined upper weight limit, and a predetermined lower weight limit.

* * * * *

UNITED STATES PATENT AND TRADEMARK OFFICE
CERTIFICATE OF CORRECTION

| | |
|---|---|
| PATENT NO. | : 7,057,118 B2 |
| APPLICATION NO. | : 10/475725 |
| DATED | : June 6, 2006 |
| INVENTOR(S) | : Ingolfur Arnason et al. |

It is certified that error appears in the above-identified patent and that said Letters Patent is hereby corrected as shown below:

In claim 6, column 6, line 3, "transfers" should read --transfer--.

In claim 13, column 6, line 19, "includes" should read --include--.

In claim 14, column 6, line 34, "bins" should read --bin--.

In claim 14, column 6, line 38, "bins" should read --bin--.

Signed and Sealed this

Twenty-second Day of August, 2006

JON W. DUDAS
*Director of the United States Patent and Trademark Office*